(12) United States Patent
Hansson et al.

(10) Patent No.: US 6,454,498 B1
(45) Date of Patent: Sep. 24, 2002

(54) CLAMPING ARRANGEMENT INCLUDING A HOLDER BLADE AND A KEYING ARRANGEMENT FOR A CUTTING INSERT

(75) Inventors: Per Hansson, Sandviken; Klas Forsström, Gävle, both of (SE)

(73) Assignee: Sandvik Aktiebolag (SE)

( * ) Notice: Subject to any disclaimer, the term of this patent is extended or adjusted under 35 U.S.C. 154(b) by 0 days.

(21) Appl. No.: 09/607,280

(22) Filed: Jun. 30, 2000

(30) Foreign Application Priority Data

Jul. 15, 1999 (SE) ................................. 9902701

(51) Int. Cl.[7] ........................... B23B 27/04; B23P 15/28
(52) U.S. Cl. ..................... 407/110; 407/72; 407/117
(58) Field of Search ....................... 407/110, 109, 407/107, 117, 72; 76/80

(56) References Cited

U.S. PATENT DOCUMENTS

| | | | | |
|---|---|---|---|---|
| 3,798,725 A | * | 3/1974 | Hanson | ........................ 407/11 |
| 5,697,271 A | | 12/1997 | Friedman et al. | |
| 5,799,554 A | | 9/1998 | Friedman et al. | |
| 5,899,643 A | * | 5/1999 | Ochler | ........................ 407/110 |
| 6,270,294 B1 | * | 8/2001 | Sjoo et al. | .................... 407/101 |

FOREIGN PATENT DOCUMENTS

| | | |
|---|---|---|
| DE | 19739855 A1 | 4/1999 |
| WO | 99/11410 | 3/1999 |
| WO | 99/15296 | 4/1999 |

* cited by examiner

Primary Examiner—Henry Tsai
(74) Attorney, Agent, or Firm—Burns, Doane, Swecker & Mathis, L.L.P.

(57) ABSTRACT

A clamping arrangement includes a holder blade having a body portion, the body portion having a key slot and a key recess are disposed relative to each other and relative to an insert-receiving slot such that, when a first keying member of a key is received in the key slot and the second keying member of the key is received in the key recess and the key is moved from an at-rest position to an opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot.

45 Claims, 7 Drawing Sheets

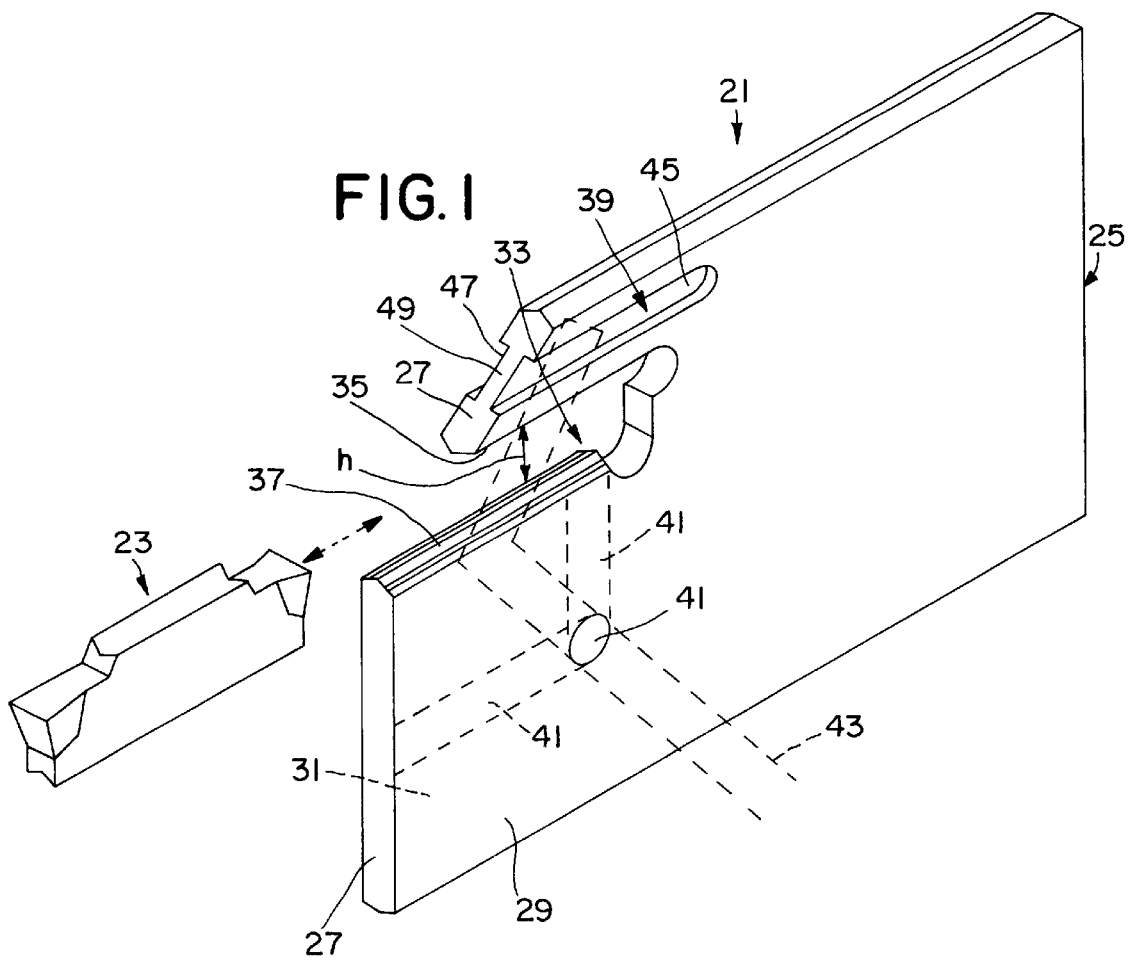
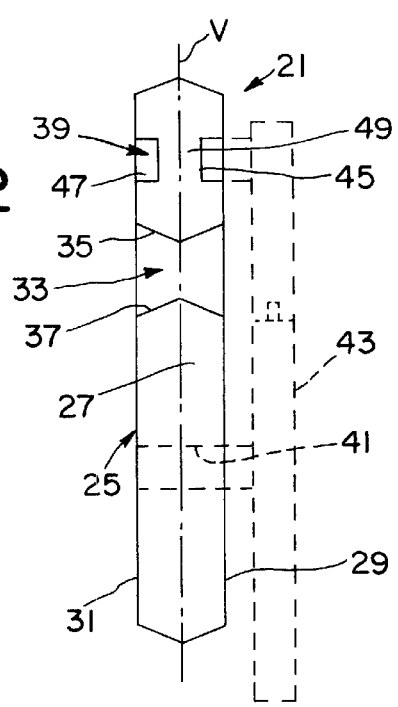

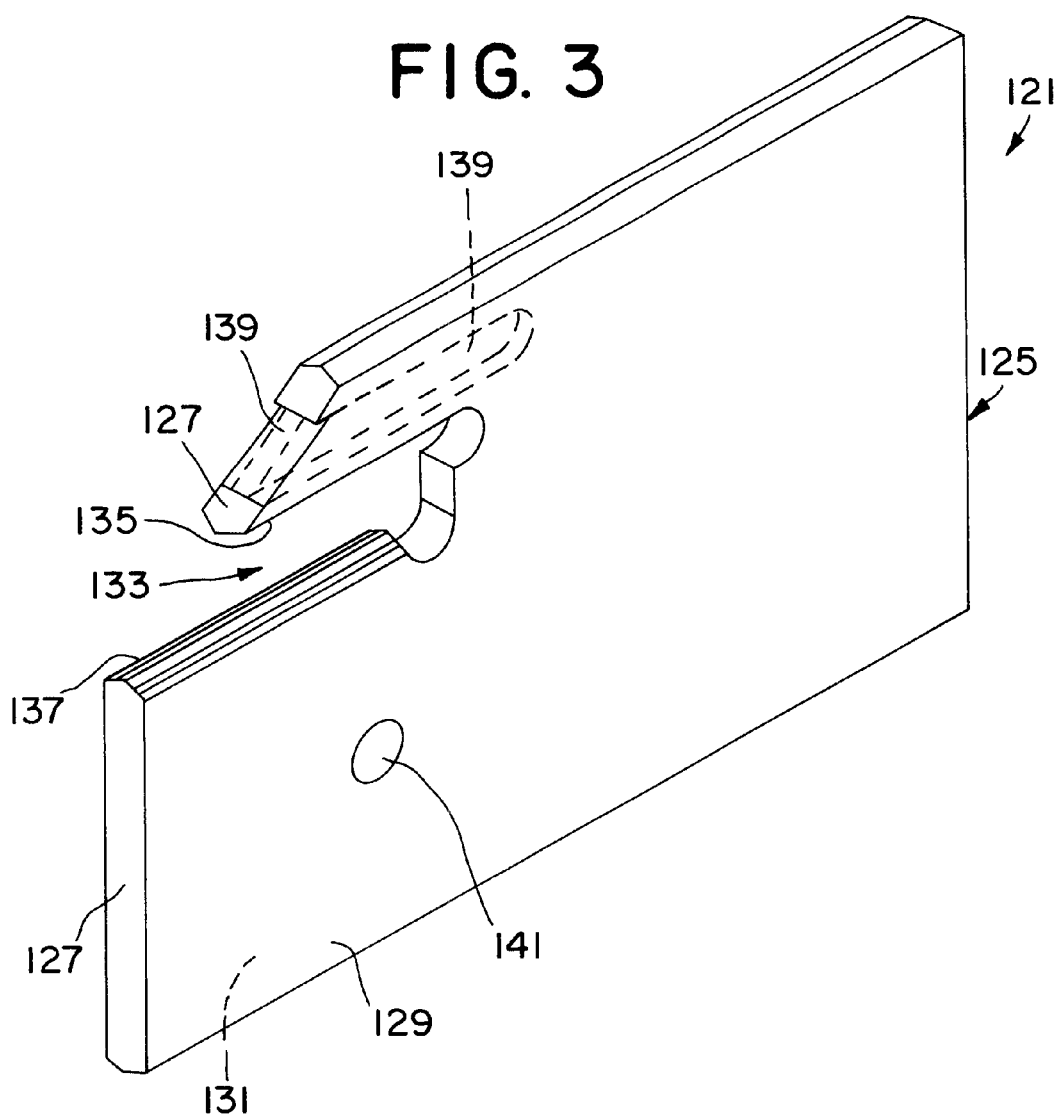

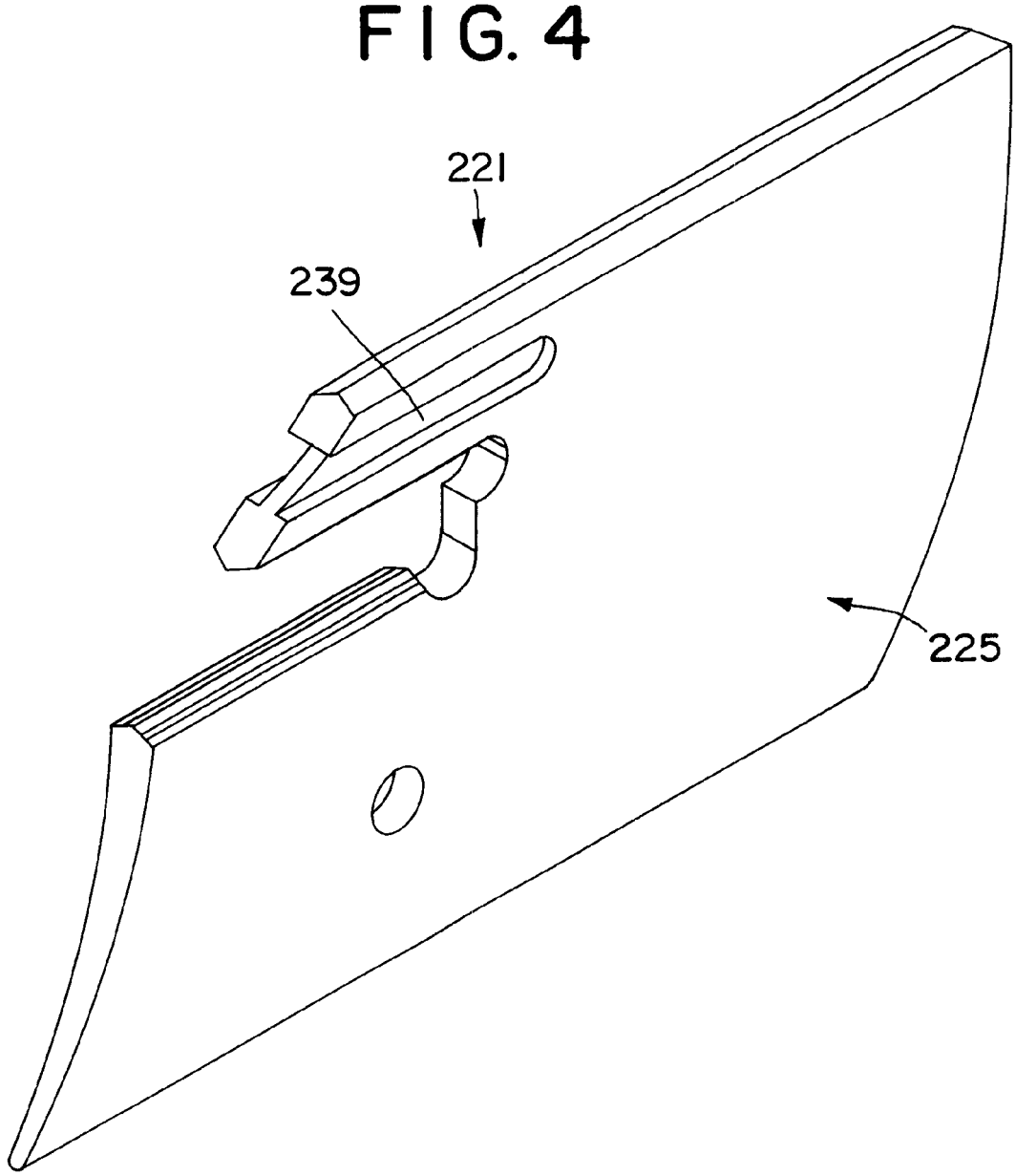

CLAMPING ARRANGEMENT INCLUDING A HOLDER BLADE AND A KEYING ARRANGEMENT FOR A CUTTING INSERT

FIELD OF THE INVENTION

The present invention relates to a clamping arrangement for a cutting insert and, more particularly, to a clamping arrangement including a holder blade having a key slot and a key recess for installing a cutting insert in an insert-receiving slot of the holder blade using a keying arrangement.

BACKGROUND AND SUMMARY

In cutting tools, for example turning tools such as lathes, it is now common, particularly in the metal-working industry, to provide replaceable cutting inserts, such as cemented carbide or tool steel inserts, on a toolholder. The inserts have cutting edges formed thereon and, after the cutting edges are worn, the inserts can be replaced. This avoids the expense of replacing the entire tool. Moreover, because the inserts can be made out of extremely hard materials, the toolholder can be made out of materials that are easier to machine. Many inserts, in addition to being replaceable, are indexable, meaning that the insert may have more than one working edge and, after one working edge is worn, the insert can be removed from the toolholder and indexed so that another working edge faces the workpiece.

Depending upon the cutting operation desired to be performed, the toolholder may be moved relative to the workpiece, the workpiece may be moved relative to the toolholder, or both the toolholder and the workpiece may be moved. Typically, very large forces are imposed on inserts during cutting operations, and tools and workpieces are moved at very high speeds, and it is necessary to securely fasten the inserts to the toolholder. There are various ways to clamp inserts in toolholders, including using bolts or screws extending through bores through the insert.

In applications such as turning applications, it is often desirable to have a thin insert mounted on a relatively thin toolholder to facilitate performing a cutting off or grooving operation deep into the workpiece. In applications such as these, it is often difficult if not impossible to have extensive extraneous clamping equipment for clamping of the insert to the toolholder. A common approach to clamping of inserts involves the use of a toolholder having an upper portion and a lower portion that define a slot at a forward end in which the insert is received. The upper portion may be fastened to the lower portion by means such as a bolt to form a cantilever that secures the insert in position as the bolt is turned to secure the upper portion to the lower portion. A disadvantage of such a multicomponent toolholder is that it is difficult to make the toolholder small enough for all applications.

Another technique for securing inserts to toolholder is by using a single-piece toolholder body in which an insert-receiving slot is formed. The insert-receiving slot is typically smaller in height than the height of the insert so that the upper and lower surfaces of the slot must be forced apart to permit installation of the insert. The resiliency of the toolholder body then operates to clamp the insert in the insert-receiving slot. U.S. Pat. Nos. 5,697,271 and 5,799,554 disclose a clamping device for a cutting insert in which the insert is installed in the holder blade by forcing apart a clamping jaw and a base jaw of a toolholder body using a specially adapted key that is applied through throughgoing apertures provided in the sides of the toolholder body. Because throughgoing apertures may, in certain operating circumstances, as well as during opening of the jaw, result in undesirable stress concentrations in a toolholder, it is desirable to provide an alternative structure that can provide an improved or different stress distribution.

The present invention permits providing clamping arrangements for single-piece toolholders that are quite narrow in width and that can be conveniently opened with a keying arrangement to permit installation of inserts in insert-receiving slots that results in improved or different stress distributions on the toolholder during operation of the cutting tool and during opening of the toolholder for insertion of an insert.

According to an embodiment of the present invention, a holder blade includes a body portion. The :body portion has a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot extending inwardly from the forward edge, and a key recess. The key slot and the key recess are disposed relative to each other such that, when a key is installed in both the key slot and the key recess and turned from an at-rest position to an opening position relative to the body portion, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot.

According to another embodiment of the present invention, a clamping arrangement includes a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess. The clamping arrangement also includes a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess. The first shaft element and the second shaft element are pivotable relative to each other from an at-rest position in which the first keying member and the second keying member are at a first distance from each other to an opening position in which the first keying member and the second keying member are at a second distance from each other, the second distance being greater than the first distance. The key slot and the key recess are disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot.

According to yet another embodiment of the present invention, a key assembly for a holder blade is disclosed. The holder blade has an insert-receiving slot extending inwardly from a front edge of the holder blade, the holder blade having a key slot and a key recess for receiving a first and a second keying member of the key assembly, the key slot and the key recess being arranged relative to the insert-receiving slot such that forces exerted on the key slot and the key recess in directions away from the insert-receiving slot cause the insert-receiving slot to become wider against resilient forces of the holder blade. The key assembly includes a first shaft element, a second shaft element pivotably attached to the first shaft element, a first keying member attached to the first shaft element and at least partially receivable in a key slot of a holder blade, and a second keying member attached to the second shaft element and at least partially receivable in a key recess of a holder blade.

BRIEF DESCRIPTION OF THE DRAWINGS

The features and advantages of the present invention are well understood by reading the following detailed description in conjunction with the drawings in which like numerals indicate similar elements and in which:

FIG. 1 is a side, perspective view of a holder blade according to an embodiment of the present invention;

FIG. 2 is a front view of a holder blade according to the embodiment of FIG. 1;

FIG. 3 is a side, perspective view of a holder blade according to a further embodiment of the present invention;

FIG. 4 is a side, perspective view of a holder blade according to yet another embodiment of the present invention;

DETAILED DESCRIPTION

Figure 5:
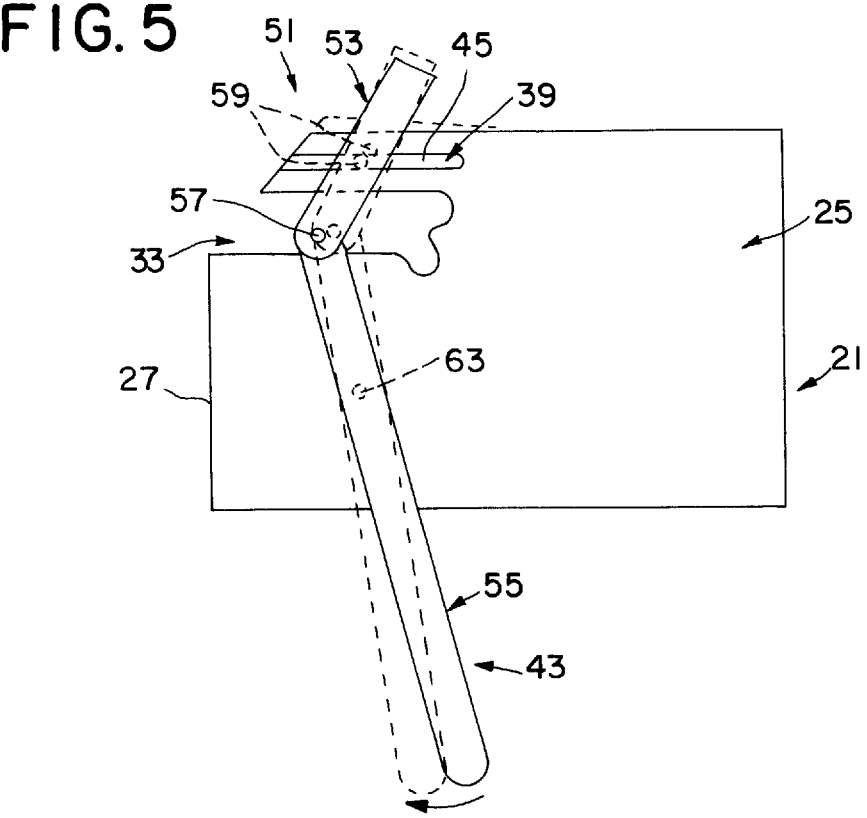
FIG. 5 is a side, perspective view of a clamping arrangement according to an embodiment of the present invention.

A holder blade 21 according to an embodiment of the present invention for holding a cutting insert 23 is shown in FIGS. 1–2. As seen in FIG. 1, the holder blade 21 includes a body portion 25. The insert 23 is preferably made of a material having a higher resistance to wear than the body portion 25, such as a tool steel insert or a cemented carbide insert, and is preferably indexable. The body portion 25 is preferably made of a strong but machinable material, such as cast iron, and is preferably machined from a single piece of material.

As seen in FIG. 2, the body portion 25 has a forward edge 27 between a first side wall 29 and an opposite, second side wall 31. An insert-receiving slot 33 extends inwardly from the forward edge 27, and preferably extends from the first side wall 29 to the second side wall 31. The insert-receiving slot 33 has an at-rest height between an upper surface 35 of the insert-receiving slot and a lower surface 37 of the insert-receiving slot. The upper surface 35 and the lower surface 37 are preferably provided with a protrusion arrangement for being received in a corresponding recess arrangement on the top and bottom sides of the insert 23 to assist in preventing movement of the insert relative to the tool holder 21. If desired or necessary, instead of having a protrusion arrangement on the upper surface 35 and the lower surface 37, a recess arrangement may be provided on the upper and lower surfaces for receiving protrusions on top and bottom surfaces of the insert.

The body portion 25 also includes a key slot 39 extending inwardly from the forward edge 27, and a key recess 41. The key slot 39 and the key recess 41 are disposed relative to each other such that, when a keying arrangement or key 43 (shown schematically and in phantom in FIG. 1) is installed in both the key slot and the key recess and turned from an at-rest position to an opening position relative to the body portion 25, the height of the insert-receiving slot 33 is increased from the at-rest height against resilient forces of the body portion to a sufficient height to install the particular insert 23 intended for use with the holder blade. When the key 43 is returned to the at-rest position, the resilient forces cause the height of the insert-receiving slot 33 to decrease and clamp the insert 23 between the upper and lower surface 35 and 37 of the insert-receiving slot.

As seen, for example, in FIG. 1, the key slot 39 extends inwardly into the body portion 25 from the first side wall 29. As seen in the embodiment of the invention shown in FIG. 2, the key slot 39 preferably includes a first portion 45 that extends inwardly into the body portion from the first side wall 29 and a second portion 47 of the key slot that extends inwardly into the body portion from the second side wall 31 although, if desired or necessary, one of the portions can be omitted. Preferably, the first and second portions 45 and 47 of the key slot 39 extend parallel to each other, inwardly from the forward edge 27 of the body portion. In this way, if the key is provided with portions for being received in both the first and second portions 45 and 47, the key can be simple in construction. Preferably, the first and second portions 45 and 47 are substantially parallel to the insert-receiving slot 33, or at least top surfaces are substantially parallel to the insert-receiving slot, so that, when the key applies a force against the upper surfaces of one or both of the first and second portions, the majority of the force will be used in causing the insert-receiving opening to open to a greater height.

The first and second portions 45 and 47 are also preferably separated by a web portion 49 of the body portion 25 to facilitate providing maximum strength to the body portion. The web or I-beam construction provided by the web portion 49 offers an improved or different stress distribution during operation of the cutting tool and during opening of the toolholder as compared to toolholders having throughgoing apertures. The first and second portions 45 and 47 of the key slot 39 are preferably symmetrically arranged relative to a vertical center axis V (FIG. 2) of the body portion 25. If desired or necessary, of course, the key slot 39 may be non-parallel to the insert-receiving slot 33 and may be in a form other than straight or substantially straight, such as curved, the first and second portion 45 and 47 may not be parallel to each other, may not be substantially parallel to the insert-receiving slot, and may be non-symmetrical, and the first and second portions may be connected at openings extending through the body portion 25.

Another embodiment of the holder blade 121 according to the present invention is shown in FIG. 3 and is adapted to hold the same insert 23, or any other suitable insert, as the holder blade 21. According to this embodiment, the key slot 139 extends inwardly from the forward edge 127 and from the first side wall 129 to the second side wall 131 of the body portion 125. Preferably, an upper surface of the key slot 139 is substantially parallel to a central axis of the insert-receiving slot 133 so that forces directed against the upper surface of the key slot primarily result in increasing the height of the insert-receiving slot between its upper surface 135 and its lower surface 137. If desired or necessary, however, the upper surface of the key slot 139 may be non-parallel to the insert receiving slot 133. As with the web portion 49 in the embodiment shown in FIGS. 1–2, the key slot 139 in the form of a notch extending inwardly from the forward edge 129 and from the first side wall 129 to the second side wall 131 of the body portion 125 offers an improved or different stress distribution during operation of the cutting tool and during opening of the toolholder as compared to toolholders having throughgoing apertures.

In both the embodiment shown in FIGS. 1–2 and the embodiment shown in FIG. 3, the key recess 41 is preferably the same. For purposes of discussion, the key recess 41 is described in connection with the embodiment illustrated in FIGS. 1–2. The key recess 41 is preferably disposed on an opposite side of the insert-receiving slot 33 from the key slot 39 but is necessarily disposed at some point relative to the insert-receiving slot and the key slot such that a force directed outwardly on a straight line extending between a position of the key in the key slot and a position of the key in the key recess causes the insert-receiving slot to open to a wider height.

The key recess 41 may be connected to the insert-receiving slot 33 or may extend inwardly from the front edge 27 as shown by the dotted lines in FIG. 1. Preferably, the key recess 41 extends from the first side wall 29 to the second side wall 31, although it may, if desired or necessary be a recess extending partially through the body portion 25 from one or both of the first side wall and the second side wall. At least a portion of the key recess 41 is preferably substantially circular to facilitate pivoting of a circular portion of the key in the key recess. There is preferably at least one key slot 39 and at least one key recess 41 on a body portion 25 according to the present invention, however, it will be appreciated that multiple key slots and/or multiple key recesses may be provided if desired or necessary.

As seen in FIG. 4, the holder blade 221 may be entirely curved or have a portion of the body portion 225 that is curved. The key slot 239 may have the general structure of the key slot 39 described with reference to FIGS. 1–2 or the key slot 139 described with reference to FIG. 3. Toolholders having curved or partially curved shapes are: generally known from, for example, turning operations for forming circular grooves.

Figure 6:
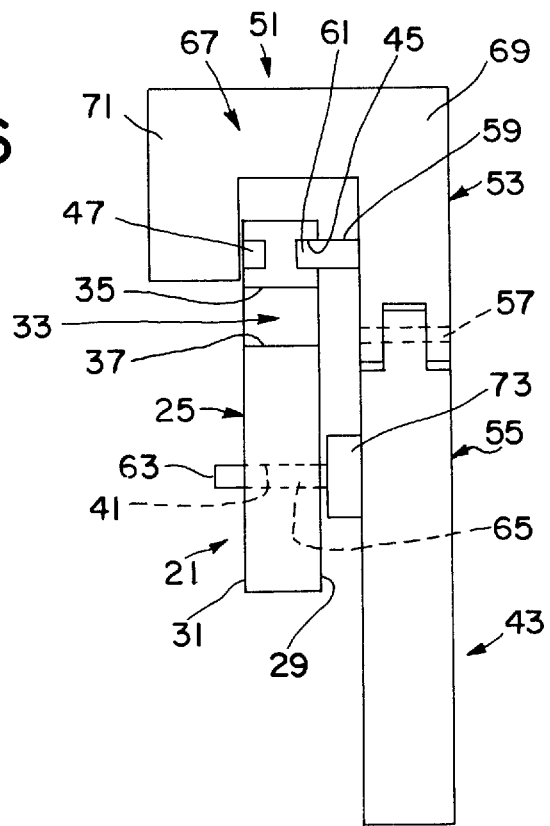
FIG. 6 is a front view of a clamping arrangement according to the embodiment of FIG. 5

As seen in FIGS. 5 and 6, an embodiment of a clamping arrangement 51 for clamping an insert 23 includes a holder blade 21 together with a key 43. The key 43 includes a first shaft element 53 and a second shaft element 55 pivotably attached to the first shaft element, such as by a pin 57. A first keying member 59 is attached to the first shaft element 53. At least a portion 61 of the first keying member 59 is receivable in the key slot 39. A second keying member 63 is attached to the second shaft element 55. At least a portion of the second keying member 63 is receivable in the key recess 41.

As seen in FIG. 5, the first shaft element 53 and the second shaft element 55 are pivotable relative to each other from an at-rest position in which the first keying member 59 and the second keying member 63 are at a first distance from each other to an opening position (shown by phantom lines FIG. 5) in which the first keying member and the second keying member are at a second distance from each other, the second distance being greater than the first distance. Because the key slot 39 and the key recess 41 are disposed relative to each other such that, when the first keying member 59 is received in the key slot and the second keying member 63 is received in the key recess and the key is moved from the at-rest position to the opening position, the height of the insert-receiving slot 33 is increased against resilient forces of the body portion 25 to a sufficient height to install an insert 23 for the holder blade. When the key 43 is returned to the at-rest position, the resilient forces cause the height of the insert-receiving slot 33 to decrease and clamp the insert between the upper and lower surface 35 and 37 of the insert-receiving slot.

In the clamping arrangement 51 shown in FIG. 5, the key slot 39 preferably extends inwardly from the forward edge 27 of the body 25. If desired or necessary, the key slot 39 may not extend from the forward edge 27 of the body, and may extend parallel to the forward edge and substantially perpendicularly to the insert-receiving slot. The key recess 41 may extend inwardly from the forward edge 27 of the body 25 as shown by dotted lines, but preferably is in the form of a recess or through-bore extending parallel to the forward edge of the body or substantially perpendicularly to the insert-receiving slot.

In the embodiment shown in FIG. 6, the first keying member 59 extends, when received in the key slot 39, in a direction substantially perpendicular to the direction in which the insert-receiving slot 33 extends from the forward edge 27 of the body. Likewise, the second keying member 63 extends, when received in the key recess 41, in a direction substantially perpendicular to the insert-receiving slot 33. If, as in the embodiment shown in FIG. 6, the key slot 39 extends from the forward edge 27 of the body 25 and the key recess 41 does not, the key 43 can be installed on the toolholder 21 by inserting the second keying member 63 in the key recess and pivoting the first shaft element 53 relative to the second shaft element 55 such that the first keying member 59 is received in a forward end of the key slot. The first keying member 59 can be moved further into the key slot 39 by appropriately pivoting the first and second shaft elements 53 and 55.

As seen in FIG. 6, the first shaft element 53 may be provided with a C-shaped end portion 67 on an end of the first shaft element remote from an end of the first shaft element that is pivotably connected to the second shaft element 55 by the pin 57. The C-shaped portion 67 defines an opening having a width no less than a distance between the first side wall 29 and the second side wall 31 between a first leg 69 of the C-shaped portion on which the first keying member 59 is disposed and a second leg 71 of the C-shaped portion such that, when the first keying member 59 is disposed in the key slot 39, the second leg of the C-shaped portion is disposed substantially adjacent one of the first side wall 29 and the second side wall 31 (shown in FIG. 6) of the body portion. If desired or necessary, the second leg 71 may be provided with a first keying member 59 that is received in the portion 47 of the key slot 39 running along the second side wall 31 like the portion 45 of the key slot running along the first side wall 29. The second leg 71 preferably provides additional stability to the keying arrangement 43 during operation and minimizes the possibility of the key slipping relative to the tool holder 21.

Figure 7:
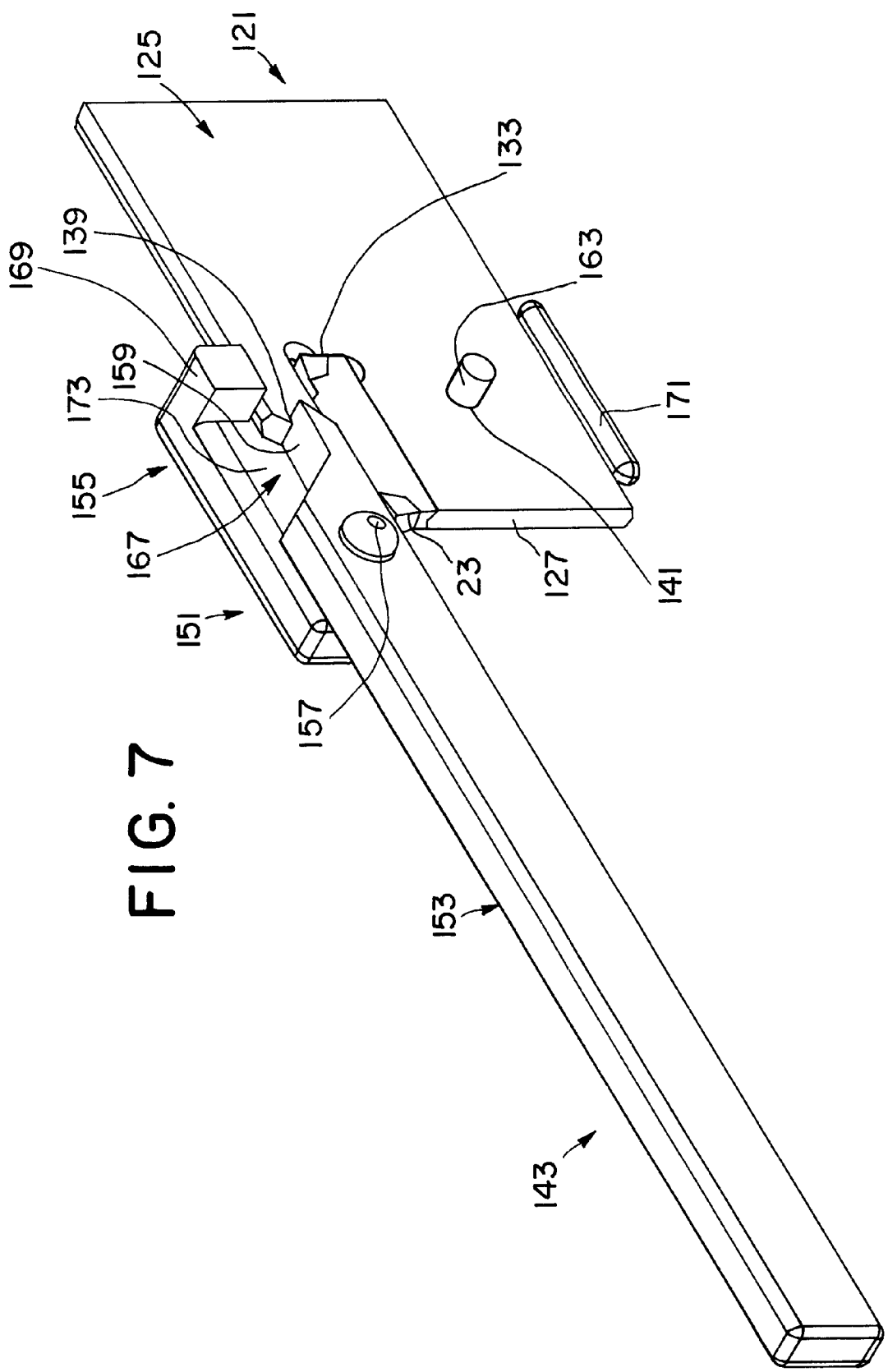
FIG. 7 is a side, perspective view of a clamping arrangement according to another embodiment of the present invention.

In the embodiment of the clamping arrangement 151 shown in FIG. 7 in which a key 143 is used with a toolholder 121 that holds an insert 23, the first keying member 159 on the first shaft element 153 extends, when received in the key slot 139, in a direction substantially parallel to the insert-receiving slot 133. The second keying member 163 on the second shaft element 155 may extend in a direction substantially parallel to the insert-receiving slot 133 into a key recess extending from the front edge 127 of the body portion 125 or, as shown in FIG. 7, substantially perpendicular to the insert-receiving slot into a key recess 141 extending substantially perpendicular to the insert-receiving slot.

In the embodiment shown in FIG. 6, a distance between the second keying member 63 and a first end of the second shaft element 55 at which the second shaft element is pivotably-attached to the first shaft element 53, i.e., the distance to the pin 57, is smaller than a distance between the second keying member and a second end of the second shaft element. In the embodiment shown in FIG. 7, a distance between the first keying member 159 and a first end of the first shaft element 153 at which the first shaft element is pivotably attached to the second shaft element 155, i.e., the distance to the pin 157, is smaller than a distance between the first keying member and a second end of the first shaft element. By providing these distance relationships, an extending length of either the first or the second shaft elements or, if desired or necessary, extending lengths of both the first and second shaft elements, can serve as levers for forcing the insert-receiving slot to an expanded height.

The second shaft element 155 may be provided with a C-shaped portion 167 having a first leg 169, a second leg 171, and a connecting web 173 between the first leg and the second leg. The second keying member 163 is preferably disposed on the connecting web 173. An inner surface of the first leg 169 and an inner surface of the second leg 171 are spaced at a distance no smaller than a distance from a top surface to a bottom surface of the holder blade 121. The first leg 169 and the second leg 171 are disposed substantially adjacent the top surface and the bottom surface of the holder blade, respectively, when the second keying member 163 is received in the key recess 141, except that some additional space is provided by the first leg to permit opening of the insert-receiving slot 133.

Figure 8:
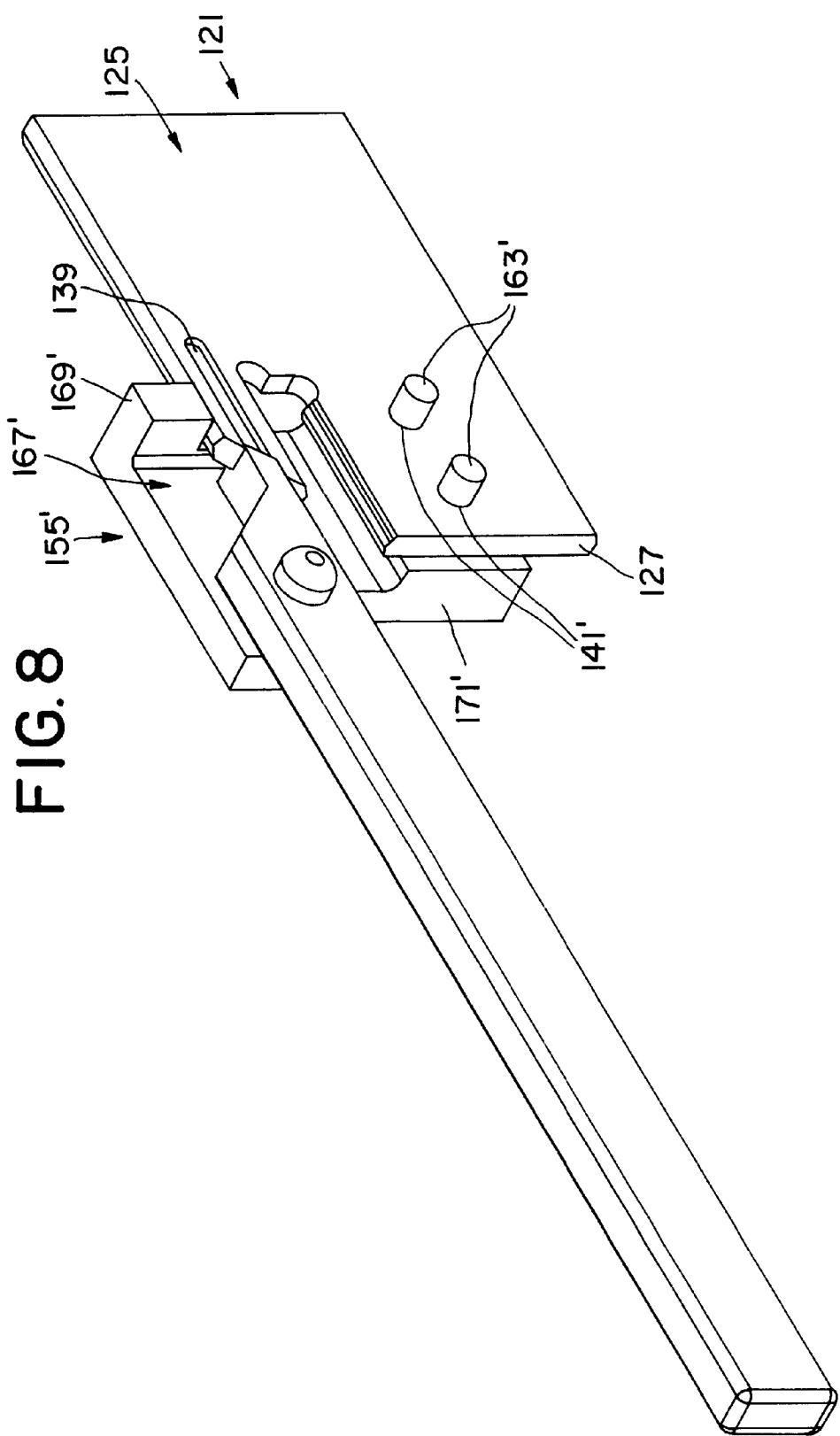
FIG. 8 is a side, perspective view of a clamping arrangement according to yet another embodiment of the present invention.

As seen in an alternative embodiment of the invention shown in FIG. 8, the second shaft element 161' may include an L-shaped portion 167' having a first leg 169' and a second leg 171' substantially perpendicular to the first leg, the second keying member 163' being disposed on the second leg and extending substantially parallel to the first leg. An inner surface of the first leg 169' is spaced from a closest point on the second keying member at a distance no smaller than a distance from a top surface of the, holder blade to a closest point of the key recess 141'. The first leg 169' is disposed substantially adjacent the top surface of the holder blade when the second keying member 163' is received in the key recess 141', except that some space is required to permit opening of the insert-receiving slot.

Figure 9:
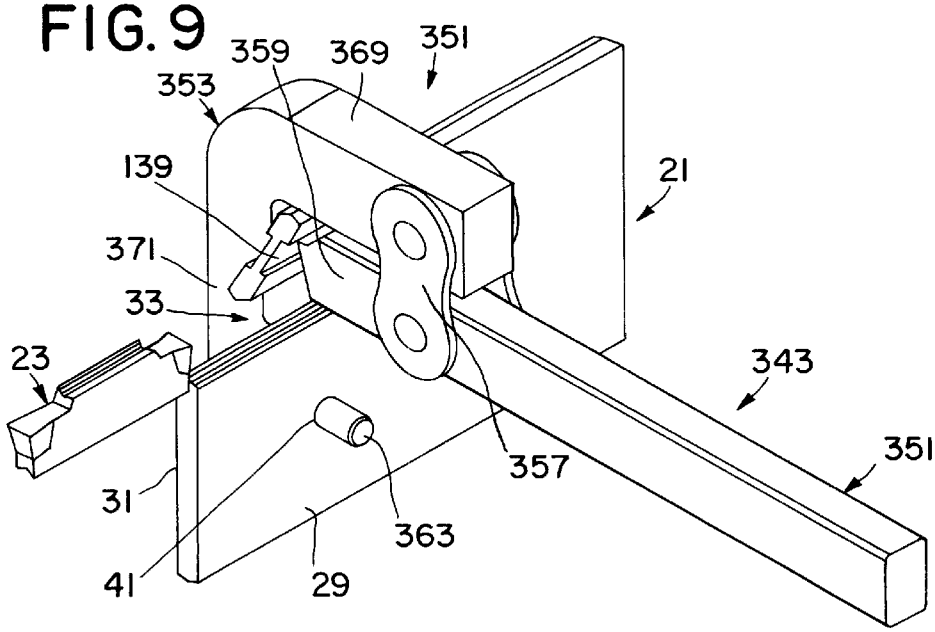
FIG. 9 is a side, perspective view of a clamping arrangement according to still another embodiment of the present invention.
Figure 10:
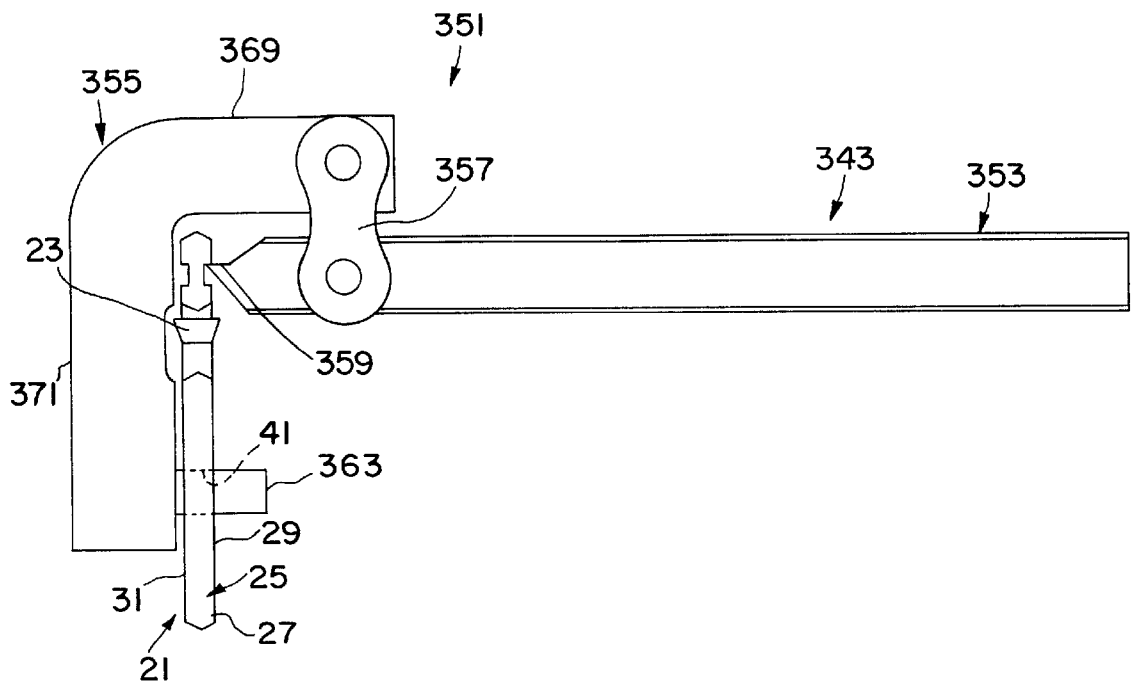
FIG. 10 is a front view of the clamping arrangement according to the embodiment of FIG. 9.

Still another embodiment of a clamping arrangement 351 is shown in FIGS. 9 and 10 wherein a key 343 is used to open the insert receiving slot 33 of a tool holder 21 for an insert 23. The key 343 includes a first shaft element 353 and a second shaft element 355 pivotably connected to each other by a suitable pin or link arrangement 357. A first keying member 359 on the first shaft element 353 is received in the key slot 39 in a direction substantially perpendicular to the insert-receiving slot 33. The second shaft element 355 is substantially L-shaped and has a first leg 369 attached to first shaft element 353 by the pin or link arrangement 357 and a second leg 371 substantially perpendicular to the first leg 369 from which the second keying member 363 extends substantially parallel to the first leg. While the first keying member 359 extends into the key slot in a direction perpendicular to the insert-receiving slot 33 and from the first side wall 29 of the body, the second keying member 363 extends into the key recess in a direction perpendicular to the insert-receiving slot but from the second side wall 31 of the body. By appropriate application of force to the first shaft element 353, the first keying member 359 and the second keying member 363 are moved apart from each other to cause the insert-receiving opening to increase in height.

The foregoing embodiments have disclosed key slots and key recesses that extend inwardly from the forward edge of the body and that do not extend inwardly from the forward edge of the body. It will be appreciated that both, one, or neither of the key slot and key recess may extend inwardly from the forward edge of the body as desired or necessary.

While this invention has been illustrated and described in accordance with a preferred embodiment, it is recognized that variations and changes may be made therein without departing from the invention as set forth in the claims.

What is claimed is:

1. A holder blade, comprising:
a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot extending inwardly from the forward edge, and a key recess;
wherein the key slot and the key recess are disposed relative to each other such that, when a key is installed in both the key slot and the key recess and turned from an at-rest position to an opening position relative to the body portion, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot.

2. The holder blade as set forth in claim 1, wherein the key slot extends inwardly into the body portion from the first side wall.

3. The holder blade as set forth in claim 1, wherein a first portion of the key slot extends inwardly into the body portion from the first side wall.

4. The holder blade as set forth in claim 3, wherein a second portion of the key slot extends inwardly into the body portion from the second side wall.

5. The holder blade as set forth in claim 4, wherein the key recess is disposed on an opposite side of the insert-receiving slot from the key slot.

6. The holder blade as set forth in claim 5, wherein the key recess is connected to the insert-receiving slot.

7. The holder blade as set forth in claim 4, wherein the key recess is connected to the insert-receiving slot.

8. The holder blade as set forth in claim 4, wherein the key recess extends from the first side wall to: the second side wall.

9. The holder blade as set forth in claim 4, wherein the first and second portions of the key slot extend parallel to each other, inwardly from the forward edge of the body portion.

10. The holder blade as set forth in claim 9, wherein the first and second portions of the key slot are separated by a web portion of the body portion.

11. The holder blade as set forth in claim 9, wherein the first and second portions of the key slot are symmetrically arranged relative to a vertical center axis of the body portion.

12. The holder blade as set forth in claim 1, wherein an upper surface of the key slot is substantially parallel to a central axis of the insert-receiving slot.

13. The holder blade as set forth in claim 1, wherein the key recess is substantially circular.

14. The holder blade as set forth in claim 1, wherein the key slot extends from the first side wall to the second side wall.

15. The holder blade as set forth in claim 14, wherein an upper surface of the key slot is substantially parallel to a central axis of the insert-receiving slot.

16. The holder blade as set forth in claim 14, wherein the key recess is disposed on an opposite side of the insert-receiving slot from the key slot.

17. The holder blade as set forth in claim 14, wherein the key recess is connected to the insert-receiving slot.

18. The holder blade as set forth in claim 14, wherein the key recess extends from the first side wall to the second side wall.

19. The holder blade as set forth in claim 14, wherein the key recess is substantially circular.

20. The holder blade as set forth in claim 1, wherein the key recess is connected to the insert-receiving slot.

21. The holder blade as set forth in claim 1, wherein the key recess extends inwardly from the front edge of the body portion.

22. The holder blade as set forth in claim 1, wherein at least a portion of the body portion is curved.

23. The holder blade as set forth in claim 1, wherein the body portion is formed of a single piece of material.

24. A clamping arrangement, comprising:
   a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess;
   a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance,
   the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein the key slot extends inwardly from the forward edge of the body.

25. The clamping arrangement as set forth in claim 24, wherein the key recess extends inwardly from the forward edge of the body.

26. The clamping arrangement as set forth in claim 24, wherein the first keying member extends, when received in the key slot, in a direction substantially perpendicular to the insert-receiving slot.

27. The clamping arrangement as set forth in claim 26, wherein the second keying member extends, when received in the key recess, in a direction substantially parallel to the insert-receiving slot.

28. The clamping arrangement as set forth in claim 26, wherein the second keying member extends, when received in the key recess, in a direction substantially perpendicular to the insert-receiving slot.

29. A clamping arrangement, comprising:
   a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess;
   a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance,
   the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein the key recess extends inwardly from the forward edge of the body.

30. A clamping arrangement, comprising:
   a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess;

a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance, the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein the first keying member extends, when received in the key slot, in a direction substantially parallel to the insert-receiving slot.

31. The clamping arrangement as set forth in claim 30, wherein the second keying member extends, when received in the key recess, in a direction substantially parallel to the insert-receiving slot.

32. The clamping arrangement as set forth in claim 30, wherein the second keying member extends, when received in the key recess, in a direction substantially perpendicular to the insert-receiving slot.

33. A clamping arrangement, comprising:

a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess;

a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance, the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein a distance between the second keying member and a first end of the second shaft element at which the second shaft element is pivotably attached to the first shaft element is smaller than a distance between the second keying member and a second end of the second shaft element.

34. A clamping arrangement, comprising:

a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess;

a key including a first shaft element, a second shaft element pivotably attached to the first shaft element, a first keying-member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance, the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein a distance between the first keying member and a first end of the first shaft element at which the first shaft element is pivotably attached to the second shaft element is smaller than a distance between the first keying member and a second end of the first shaft element.

35. A clamping arrangement, comprising:

a holder blade having a body portion, the body portion having a forward edge between a first side wall and an opposite, second side wall, an insert-receiving slot extending, inwardly from the forward edge, the insert-receiving slot extending from the first side wall to the second side wall and having a height between an upper surface of the insert-receiving slot and a lower surface of the insert-receiving slot, a key slot, and a key recess;

a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance, the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein the first shaft element includes a C-shaped end portion on an end of the first shaft element remote from an end of the first shaft element that is pivotably connected to the second shaft element, the C-shaped portion defining an opening having a width no less than a distance between the first side wall and the second side wall between a first leg of the C-shaped portion on which the first keying member is disposed and a second leg of the C-shaped portion such that, when the first keying member is disposed in the key slot, the second leg of the C-shaped portion is disposed substantially adjacent one of the first and the second side walls of the body portion.

36. A clamping arrangement, comprising:

a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess;

a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance, the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein the second shaft element includes a C-shaped portion having a first leg, a second leg, and a connecting web between the first leg and the second leg, the second keying member being disposed on the connecting web, an inner surface of the first leg and an inner surface of the second leg being spaced at a distance no smaller than a distance from a top surface to a bottom surface of the holder blade, the first leg and the second leg being disposed substantially adjacent the top surface and the bottom surface of the holder blade, respectively, when the second keying member is received in the key recess.

37. The clamping arrangement as set forth in claim 36, wherein the key slot extends inwardly from the forward edge of the body.

38. The clamping arrangement as set forth in claim 37, wherein the first keying member extends, when received in the key slot, in a direction substantially parallel to the insert-receiving slot.

39. The clamping arrangement as set forth in claim 36, wherein the first keying member extends, when received in the key slot, in a direction substantially perpendicular to the insert-receiving slot.

40. A clamping arrangement, comprising:

a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess;

a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance, the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein the second shaft element includes an L-shaped portion having a first leg and a second leg substantially perpendicular to the first leg, the second keying member being disposed on the second leg: and extending substantially parallel to the first leg, an inner surface of the first leg being spaced from a closest point on the second keying member at a distance no smaller than a distance from a top surface of the holder blade to a closest point of the key recess, the first leg being disposed substantially adjacent the top surface of the holder blade when the second keying member is received in the key recess.

41. A clamping arrangement, comprising:

a holder blade having a body portion, the body portion having a forward edge between a first side wall and an opposite, second side wall, an insert-receiving slot extending inwardly from the forward edge, the insert-receiving slot extending from the first side wall to the second side wall and having a height between an upper surface of the insert-receiving slot and a lower surface of the insert-receiving slot, a key slot, and a key recess;

a key including a first shaft element, a second shaft element pivotably attached to the first shaft element, a first keying member attached to the first shaft element, at least a portion of the first keying member being receivable in the key slot, and a second keying member attached to the second shaft element, at least a portion of the second keying member being receivable in the key recess, the first shaft element and the second shaft element being pivotable relative to each other from an at-rest position in which the first keying member and the second keying member are at a first distance from each other to an opening position in which the first keying member and the second keying member are at a second distance from each other, the second distance being greater than the first distance, the key slot and the key recess being disposed relative to each other such that, when the first keying member is received in the key slot and the second keying member is received in the key recess and the key is moved from the at-rest position to the opening position, the height of the insert-receiving slot is increased against resilient forces of the body portion to a sufficient height to install an insert for the holder blade and, when the key is returned to the at-rest position, the resilient forces cause the height of the insert-receiving slot to decrease and clamp the insert between the upper and lower surface of the insert-receiving slot, wherein the second shaft element includes an L-shaped portion having a first leg and a second leg substantially perpendicular to the first leg, the second keying member being disposed on the second leg and extending substantially parallel to the first leg.

42. A key assembly for a holder blade having an insert-receiving slot extending inwardly from a front edge of the holder blade, the holder blade having a key slot and a key recess for receiving a first and a second keying member of the key assembly, the key slot and the key recess being arranged relative to the insert-receiving slot such that forces exerted on the key slot and the key recess in directions away from the insert-receiving slot cause the insert-receiving slot to become wider against resilient forces of the holder blade, the key assembly comprising:

a first shaft element;

a second shaft element pivotably attached to the first shaft element;

a first keying member attached to the first shaft element and at least partially receivable in a key slot of a holder blade;

a second keying member attached to the second shaft element and at least partially receivable in a key recess of a holder blade, wherein the first shaft element includes a C-shaped end portion on an end of the first shaft element remote from an end of the first shaft element that is pivotably connected to the second shaft element, the C-shaped portion defining an opening having a width no less than a distance between the first side wall and the second side wall between a first leg of the C-shaped portion on which the first keying member is disposed and a second leg of the C-shaped portion such that, when the first keying member is disposed in the key slot, the second leg of the C-shaped portion is disposed substantially adjacent one of the first and the second side walls of the body portion.

43. A key assembly for a holder blade having an insert-receiving slot extending inwardly from a front edge of the holder blade, the holder blade having a key slot and a key recess for receiving a first and a second keying member of the key assembly, the key slot and the key recess being arranged relative to the insert-receiving slot such that forces exerted on the key slot and the key recess in directions away from the insert-receiving slot cause the insert-receiving slot to become wider against resilient forces of the holder blade, the key assembly comprising:

a first shaft element;

a second shaft element pivotably attached to the first shaft element;

a first keying member attached to the first shaft element and at least partially receivable in a key slot of a holder blade;

a second keying member attached to the second shaft element and at least partially receivable in a key recess of a holder blade, wherein the second shaft element includes a C-shaped portion having a first leg, a second leg, and a connecting web between the first leg and the second leg, the second keying member being disposed on the connecting web, an inner surface of the first leg and an inner surface of the second leg being spaced at a distance no smaller than a distance from a top surface to a bottom surface of the holder blade, the first leg and the second leg being disposed substantially adjacent the top surface and the bottom surface of the holder blade, respectively, when the second keying member is received in the key recess.

44. A key assembly for a holder blade having an insert-receiving slot extending inwardly from a front edge of the holder blade, the holder blade having a key slot and a key recess for receiving a first and a second keying member of the key assembly, the key slot and the key recess being arranged relative to the insert-receiving slot such that forces exerted on the key slot and the key recess in directions away from the insert-receiving slot cause the insert-receiving slot to become wider against resilient forces of the holder blade, the key assembly comprising:

a first shaft element;

a second shaft element pivotably attached to the first shaft element;

a first keying member attached to the first shaft element and at least partially receivable in a key slot of a holder blade;

a second keying member attached to the second shaft element and at least partially receivable in a key recess of a holder blade, wherein the second shaft element includes an L-shaped portion having a first leg and a second leg substantially perpendicular to the first leg, the second keying member being disposed on the second leg and extending substantially parallel to the first leg, an inner surface of the first leg being spaced from a closest point on the second keying member at a distance no smaller than a distance from a top surface of the holder blade to a closest point of the key recess, the first leg being disposed substantially adjacent the top surface of the holder blade when the second keying member is received in the key recess.

45. A key assembly for a holder blade having an insert-receiving slot extending inwardly from a front edge of the holder blade, the holder blade having a key slot and a key recess for receiving a first and a second keying member of the key assembly, the key slot and the key recess being arranged relative to the insert-receiving slot such that forces exerted on the key slot and the key recess in directions away from the insert-receiving slot cause the insert-receiving slot to become wider against resilient forces of the holder blade, the key assembly comprising:

a first shaft element;

a second shaft element pivotably attached to the first shaft element;

a first keying member attached to the first shaft element and at least partially receivable in a key slot of a holder blade;

a second keying member attached to the second shaft element and at least partially receivable in a key recess of a holder blade, wherein the second shaft element includes an L-shaped portion having a first leg and a second leg substantially perpendicular to the first leg, the second keying member being disposed on the second leg and extending substantially parallel to the first leg.

* * * * *